(12) United States Patent
Wang

(10) Patent No.: US 9,517,432 B1
(45) Date of Patent: Dec. 13, 2016

(54) DEHUMIDIFIER

(71) Applicant: Hsiu-Fen Wang, Tainan (TW)

(72) Inventor: Hsiu-Fen Wang, Tainan (TW)

( * ) Notice: Subject to any disclaimer, the term of this patent is extended or adjusted under 35 U.S.C. 154(b) by 50 days.

(21) Appl. No.: 14/748,426

(22) Filed: Jun. 24, 2015

(51) Int. Cl.
*B01D 53/02* (2006.01)
*B01D 53/04* (2006.01)

(52) U.S. Cl.
CPC ....... *B01D 53/0438* (2013.01); *B01D 2257/80* (2013.01); *B01D 2259/40096* (2013.01); *B01D 2259/45* (2013.01)

(58) Field of Classification Search
CPC ............ B01D 53/0438; B01D 2257/80; B01D 2259/45; B01D 2259/40096
See application file for complete search history.

(56) References Cited

U.S. PATENT DOCUMENTS

| | | | | | |
|---|---|---|---|---|---|
| 2,414,642 | A * | 1/1947 | Wright | ........................ | F26B 9/066 34/225 |
| 2,994,404 | A * | 8/1961 | Schifferly | ............ | B01D 53/261 206/0.5 |
| 3,577,710 | A * | 5/1971 | Feldman | .................... | F24F 3/16 55/318 |
| 4,361,425 | A * | 11/1982 | Hata | .................... | B60T 17/004 55/309 |
| 4,768,355 | A * | 9/1988 | Breuhan | ................ | F25B 43/006 261/DIG. 6 |
| 5,230,719 | A * | 7/1993 | Berner | .................... | F24F 3/1411 165/4 |
| 5,799,728 | A * | 9/1998 | Blume | .................... | F24F 3/1405 165/231 |
| 6,772,534 | B2 * | 8/2004 | Gomes | .................... | F24F 3/1411 34/210 |
| 6,981,337 | B2 * | 1/2006 | Jones | .................... | B01D 53/261 34/80 |
| 7,419,534 | B2 * | 9/2008 | Hirano | ................ | H05K 7/20181 165/119 |
| 9,205,368 | B2 * | 12/2015 | Hashida | ............. | B01D 53/0407 |
| 2003/0121418 | A1 * | 7/2003 | Loop | .................. | B01D 53/0454 96/117.5 |
| 2004/0060444 | A1 * | 4/2004 | Smith | ................ | B01D 53/0415 96/108 |
| 2004/0237333 | A1 * | 12/2004 | Gomes | .................... | F24F 3/1411 34/330 |
| 2005/0198993 | A1 * | 9/2005 | Corrigan | ............ | B01D 53/0415 62/474 |

* cited by examiner

*Primary Examiner* — Christopher P Jones
(74) *Attorney, Agent, or Firm* — Rosenberg, Klein & Lee

(57) ABSTRACT

A dehumidifier is revealed. A moisture-absorbing package comprises a pouch made of a fabric material having good breathability and hygroscopic substances filled in the pouch. A humidity-indicating unit made of a humidity sensing agent is mounted on an outer surface of the pouch, whereby upon saturation of water vapor as absorbed by the hygroscopic substances in the pouch, the humidity-indicating unit changes the color for indicating the timing of regenerating the hygroscopic substances. When the moisture-absorbing package is saturated with moisture, it is put in a box, and the box is put at an air outlet of a blowing device. The air blown from a blower of the blowing device is heated by an electric heating element and blown to the box for drying the moisture-absorbing package in the box to regenerate it. Then, the moisture-absorbing package removed from the box is put in different space to absorb moisture independently.

3 Claims, 2 Drawing Sheets

US 9,517,432 B1

DEHUMIDIFIER

BACKGROUND OF THE INVENTION

Field of the Invention

The present invention relates a dehumidifier. More particularly, the disclosure relates to a dehumidifier that can improve the regeneration efficiency and the sanitary property of a moisture-absorbing package to increase the dehumidify effect of the moisture-absorbing package.

Description of Related Art

The currently available moisture-absorbing package comprises an appropriate amount of hygroscopic elements inside for absorbing the moisture from the air via the pores on the surface of the bag, so that the ambient environment containing the moisture-absorbing package could be kept dry. When the hygroscopic elements are saturated with the moisture, user can dry the moisture-absorbing package to regenerate the hygroscopic elements.

The microwave is used for the currently available dry method of the moisture-absorbing package by user. The moisture-absorbing package is put into the microwave and heated to dry for removing the water vapor absorbed by the hygroscopic elements quickly in a short time. The foregoing method is convenient, however, the microwave is mainly used to heat food in a family, and the moisture-absorbing package absorbs not only the moisture from the air but also the bacterial, the fungi, and other dirt. When the moisture-absorbing package is dried by the microwave, the bacterial, the fungi, and other dirt will transform to adhere to the microwave. Then, when the food is heated by the microwave, the bacterial, the fungi, and other dirt will be transformed to adhere to the food, causing the doubt about hygiene. Accordingly, some users expose the moisture-absorbing package to sunlight to dry the moisture-absorbing package. However, the moisture in the air is also absorbed by the moisture-absorbing package when the moisture-absorbing package exposure to sunlight, the process for drying and regeneration is too slow to inefficient.

SUMMARY OF THE INVENTION

Therefore, the object of the present invention is to provide a dehumidifier that can improve the regeneration efficiency and the sanitary property of a moisture-absorbing package to increase the dehumidify effect of the moisture-absorbing package.

For the above object, a dehumidifier comprises a moisture-absorbing package, a blowing device, and a box. The moisture-absorbing package comprises a pouch made of a fabric material and formed with a plurality of aeration holes, several granular hygroscopic substances filled in the pouch, and a humidity-indicating unit made of a humidity sensing agent and mounted on an outer surface of the pouch, whereby upon saturation of water vapor as absorbed by the hygroscopic substances in the pouch, the humidity-indicating unit changes the color. The blowing device comprises a hollow base having an air outlet, a blower and an electric heating element set in the hollow base. The box is put at the air outlet of the hollow base of the blowing device, wherein the box has a space for putting the moisture-absorbing package and is formed with a plurality of vias communicated with the space. The moisture-absorbing package can be put in the box to absorb moisture or can be separated from the box to absorb moisture independently.

According to an embodiment, the foregoing blowing device further comprises a switch coupled with the blower and the electric heating element for switching between a ventilation mode and a dry mode.

According to an embodiment, the periphery of an opening of the space of the box is formed with a flange to abut to the air outlet of the hollow base for closing the air outlet of the hollow base.

When the moisture-absorbing package is saturated with the moisture, it is put in the box which is put at an air outlet of a blowing device. The air ventilated from outside by the blower of the blowing device is heated by an electric heating element and then moved to the box for drying the moisture-absorbing package in the box to regenerate it. Then, the moisture-absorbing package is removed from the box and put in different space to absorb moisture independently. When the user want to accelerate the dehumidify effect of the dehumidifier in the ambient environment, the moisture-absorbing package is put in the box, and the air ventilated from the blower of the blowing device is moved to the box, so that the moisture is absorbed from the air while the air passes through the moisture-absorbing package.

DETAILED DESCRIPTION OF THE PREFERRED EMBODIMENT

Figure 1:
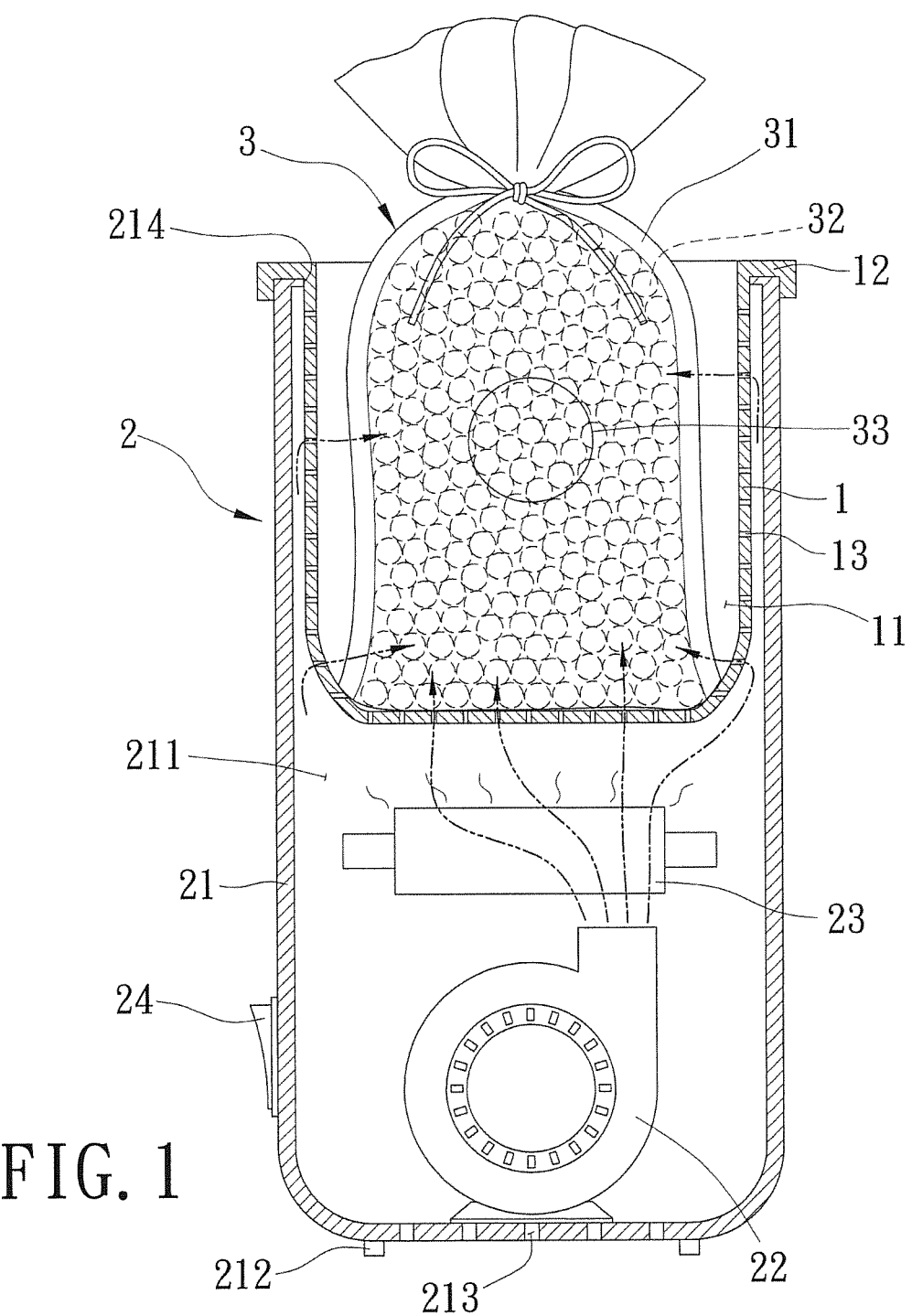
FIG. 1 is a cross-sectional view of a dehumidifier under drying mode according to an embodiment of the present invention.

Please refer to FIG. 1, which is a cross-sectional view of a dehumidifier under drying mode according to an embodiment of the present invention. The dehumidifier comprises a box 1, a blowing device 2, and at least one moisture-absorbing package 3.

The box 1 has a space 11 and the periphery of an opening of the space 11 is formed with a flange 12. The wall of the box 1 is formed with several vias 13 communicated with the space 11.

The blowing device 2 comprises a base 21, a blower 22, and an electric heating element 23. The inside of the base 21 has a hollow part 211, and the base 21 has a supporting part 212 outwardly projected from the bottom surface of the base 21 so that the bottom surface of the base 21 does not touch the ground. The bottom surface of the base 21 has several air inlets 213 communicated with the hollow part 211 of the base 21. The blower 22 is set in the hollow part 211 of the base 21, and the electric heating element 23 is set above the blower 22. The top end of the base 21 is formed with an air outlet 214 of the hollow part 211, and the box 1 is set into the hollow part 211 of the base 21 from the air outlet 214, and the flange 12 of the box 1 is abutted to the air outlet 214 of the base 21 for positioning the box 1, and the air outlet 214 of the base 21 is closed by the flange 12 of the box 1. A switch 24 is set on the base 21 and is coupled with the blower 22 and the electric heating element 23 for switching between a ventilation mode and a dry mode. The switch 24 is connected to a power supply such as a power cord.

The moisture-absorbing package 3 comprises a pouch 31, several granular hygroscopic substances 32, and a humidity-indicating unit 33. The pouch 31 is an independent bag which is made of a fabric material and is formed with several aeration holes. The granular hygroscopic substances 32 are filled in the pouch 31. The humidity-indicating unit 33 is made of a humidity sensing agent and mounted on an outer surface of the pouch 31, whereby upon saturation of water vapor as absorbed by the hygroscopic substances 32, the humidity-indicating unit 33 changes the color to indicate the time to regenerate the moisture-absorbing package 3. The moisture-absorbing package 3 can be put in the box 1 to absorb moisture or can be separated from the box 1 to put in every space for absorbing moisture independently.

Therefore, when the hygroscopic substances 32 in the pouch 31 of the moisture-absorbing package 3 is saturated with the moisture, the moisture permeates through the pouch 31 to make the color of the humidity-indicating unit 33 change. At that time, the user can dry the moisture-absorbing package 3 to regenerate the granular hygroscopic substances 32. As the dry process for the moisture-absorbing package 3 is in progress, the moisture-absorbing package 3 is put into the space 11 of the box 1 which is assembled with the blowing device 2 by user. Then, the switch 24 of the blowing device 2 is changed to the dry mode; meantime, the current is conducted to the blower 22 and the electric heating element 23 to make the blower 22 and the electric heating element 23 act. In detail, the air is ventilated from the air inlet 213 on the bottom surface of the base 21 into the hollow part 211 of the base 21 by the blower 22 and then is moved to the electric heating element 23 above the blower 22. The air is heated by the electric heating element 23 while it passes through the electric heating element 23 and then moves to the box 1 positioned at the top of the base 21, so that the heated air moves into the space 11 via the vias 13 at the wall of the box 1 to dry the moisture-absorbing package 3 in the box 1, thereby regenerating the hygroscopic substances 32 in the moisture-absorbing package 3 for absorbing the moisture again. Accordingly, the regeneration efficiency and the sanitary property of the moisture-absorbing package 3 are increased. After that, the dried moisture-absorbing package 3 is taken out from the box 1 to put in the space such as wardrobe, bookcase, shoe cabinet, and cabinet, for absorbing moisture.

Figure 2:
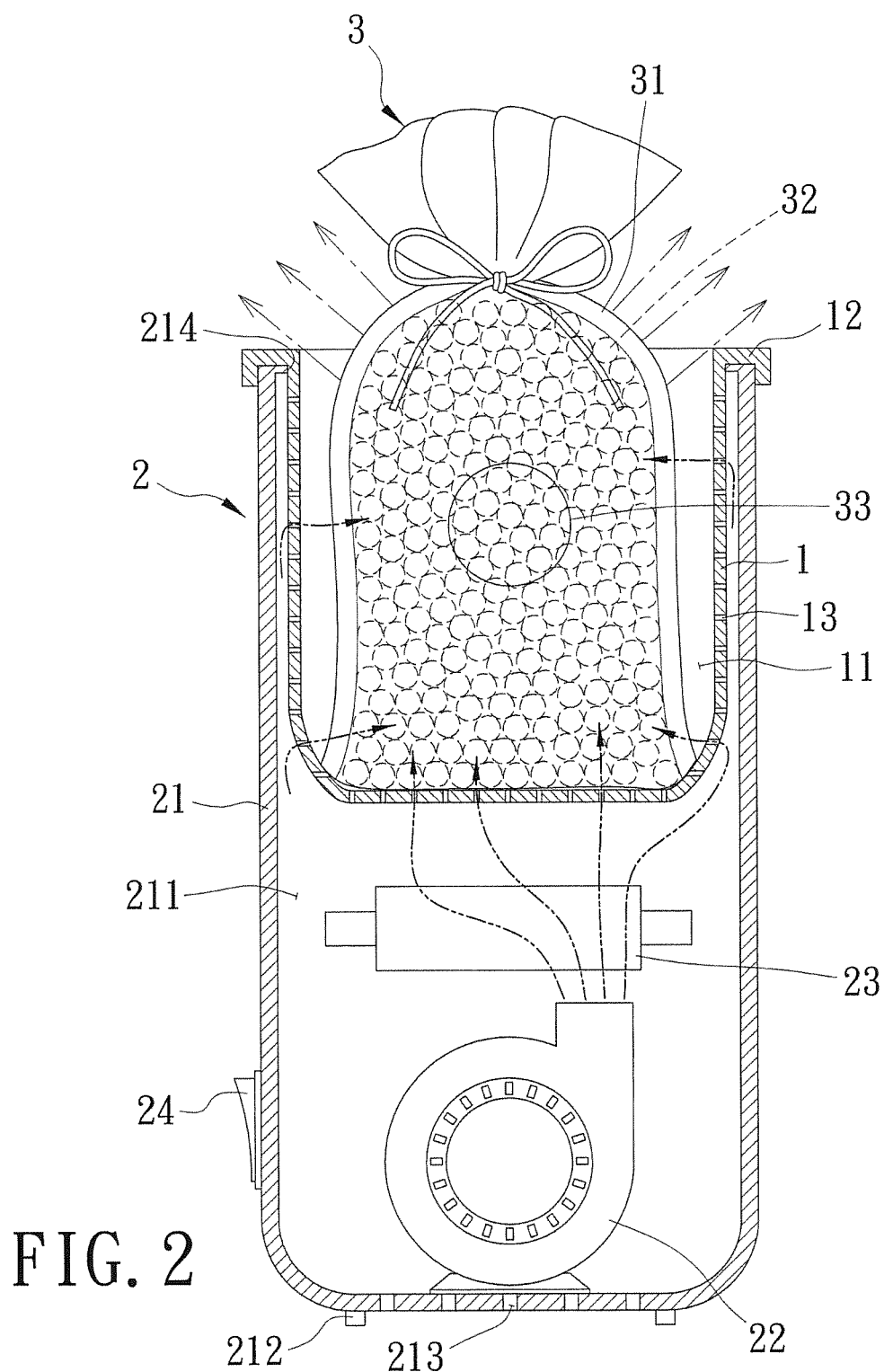
FIG. 2 is a cross-sectional view of a dehumidifier under dehumidify mode according to an embodiment of the present invention.

Furthermore, if the user wants to accelerate the dehumidify effect of the dehumidifier on the environment, please refer to FIG. 2, the moisture-absorbing package 3 is put into the space 11 of the box 1, and then the switch 24 of the blowing device 2 is changed to the ventilation mode, meantime, the current is conducted to the blower 22 to make the blower 22 act. The air is ventilated from the air inlet 213 on the bottom surface of the base 21 into the hollow part 211 of the base 21 by the blower 22 and then is blow to the box 1 positioned at the top of the base 21, so that the air moves into the space 11 via the vias 13 at the wall of the box 1 to pass through the moisture-absorbing package 3 in the space 11, thereby the granular hygroscopic substances 32 in the moisture-absorbing package 3 absorbing the moisture from the air, achieving the dehumidification effect as the air passed through the moisture-absorbing package 3.

What is claimed is:

1. A dehumidifier, comprising:
    a moisture-absorbing package, comprising:
        a pouch, made of a fabric material and formed with a plurality of aeration holes;
        a plurality of granular hygroscopic substances, filled in the pouch; and
        a humidity-indicating unit, made of a humidity sensing agent and mounted on an outer surface of the pouch, whereby upon saturation of water vapor as absorbed by the hygroscopic substances in the pouch, the humidity-indicating unit changes the color;
    a blowing device, comprising:
        a hollow base, having an air outlet;
        a blower, set in the hollow base; and
        an electric heating element, set in the hollow base; and
    a box, put at the air outlet of the hollow base of the blowing device, wherein the box has a space for putting the moisture-absorbing package and is formed with a plurality of vias communicated with the space,
    wherein the moisture-absorbing package can be put in the box to absorb moisture or can be separated from the box to absorb moisture independently.

2. The dehumidifier according to claim 1, the blowing device further comprising a switch, coupled with the blower and the electric heating element for switching between a ventilation mode and a dry mode.

3. The dehumidifier according to claim 1, wherein the periphery of an opening of the space of the box is formed with a flange to abut to the air outlet of the hollow base for closing the air outlet of the hollow base.

* * * * *